US011890817B2

(12) United States Patent
Hutchinson

(10) Patent No.: US 11,890,817 B2
(45) Date of Patent: *Feb. 6, 2024

(54) SYSTEM AND METHOD OF MANUFACTURING AN ADDITIVELY MANUFACTURED OBJECT

(71) Applicant: PostProcess Technologies, Inc., Buffalo, NY (US)

(72) Inventor: Daniel Joshua Hutchinson, Buffalo, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/472,599

(22) Filed: Sep. 11, 2021

(65) Prior Publication Data

US 2022/0040929 A1 Feb. 10, 2022

Related U.S. Application Data

(62) Division of application No. 16/298,550, filed on Mar. 11, 2019, now Pat. No. 11,141,922.

(Continued)

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/153* (2017.08); *B29C 64/205* (2017.08);
(Continued)

(58) Field of Classification Search
CPC ......... B33Y 10/00; B33Y 30/00; B33Y 40/20; B33Y 50/02
See application file for complete search history.

(56) References Cited

U.S. PATENT DOCUMENTS 9,724,876 B2  8/2017 Cheverton et al.
9,846,556 B2  12/2017 Cudak et al.
(Continued)

FOREIGN PATENT DOCUMENTS

CN      205395198 U    7/2016
JP      2015-229248 A  12/2015
(Continued)

OTHER PUBLICATIONS

Vaissier, B., Simulations in 3D Printing, 2019, https://www.3dhubs.com/knowledge-base/simulations-3d-printing, 9 pages.

*Primary Examiner* — Vincent H Tran
(74) *Attorney, Agent, or Firm* — Lempia Summerfield Katz LLC

(57) ABSTRACT

Methods and systems according to the invention may be used to modify a manufacturing plan for an object manufactured by an additive manufacturing process. A digital representation of a desired object and a manufacturing plan may be compared to manufacturing information generated via an evaluation of such an object. Based on that comparison, the manufacturing plan may be modified so that that object or a subsequent object is highly similar to the desired object.

20 Claims, 6 Drawing Sheets

Related U.S. Application Data

(60) Provisional application No. 62/641,317, filed on Mar. 10, 2018.

(51) Int. Cl.

| | | |
|---|---|---|
| *B29C 64/205* | (2017.01) | |
| *B29C 64/153* | (2017.01) | |
| *B22F 10/12* | (2021.01) | |
| *B22F 10/14* | (2021.01) | |
| *B22F 10/18* | (2021.01) | |
| *B22F 10/28* | (2021.01) | |
| *B22F 12/53* | (2021.01) | |
| *B22F 12/82* | (2021.01) | |
| *B22F 12/90* | (2021.01) | |
| *B22F 10/40* | (2021.01) | |
| *B22F 10/85* | (2021.01) | |
| *B22F 10/60* | (2021.01) | |

(52) U.S. Cl.
CPC ............... B33Y 50/02 (2014.12); *B22F 10/12* (2021.01); *B22F 10/14* (2021.01); *B22F 10/18* (2021.01); *B22F 10/28* (2021.01); *B22F 10/40* (2021.01); *B22F 10/60* (2021.01); *B22F 10/85* (2021.01); *B22F 12/53* (2021.01); *B22F 12/82* (2021.01); *B22F 12/90* (2021.01)

(56) References Cited

U.S. PATENT DOCUMENTS

| | | | |
|---|---|---|---|
| 9,855,698 | B2 | 1/2018 | Perez et al. |
| 9,916,684 | B2 | 3/2018 | Goel et al. |
| 9,977,425 | B1 | 5/2018 | McCAnn et al. |
| 10,391,712 | B2 | 8/2019 | Hoover et al. |
| 10,889,053 | B1 | 1/2021 | Miller et al. |
| 11,141,922 | B2 * | 10/2021 | Hutchinson ............. B29C 64/40 |
| 2011/0282482 | A1 | 11/2011 | Knighton |
| 2013/0089642 | A1 * | 4/2013 | Lipson ................... B33Y 10/00 |
| | | | 426/115 |
| 2015/0057785 | A1 | 2/2015 | Liu et al. |
| 2015/0165683 | A1 * | 6/2015 | Cheverton ............ B29C 64/112 |
| | | | 382/141 |
| 2015/0174828 | A1 | 6/2015 | Creuzer et al. |
| 2015/0177158 | A1 | 6/2015 | Cheverton |
| 2016/0200050 | A1 * | 7/2016 | Volk ...................... B29C 64/386 |
| | | | 700/98 |
| 2016/0368077 | A1 * | 12/2016 | Swaminathan ...... B23K 10/003 |
| 2016/0368219 | A1 | 12/2016 | Lubin et al. |
| 2017/0190104 | A1 * | 7/2017 | Bostick ................. B29C 64/106 |
| 2017/0190119 | A1 * | 7/2017 | Dow ...................... B25J 9/1682 |
| 2017/0232515 | A1 | 8/2017 | Demuth et al. |
| 2017/0239893 | A1 | 8/2017 | Hoover et al. |
| 2017/0300037 | A1 | 10/2017 | Platts et al. |
| 2017/0300038 | A1 | 10/2017 | Chen et al. |
| 2017/0310935 | A1 * | 10/2017 | Sinclair ................. B29C 64/245 |
| 2018/0067464 | A1 | 3/2018 | Budge et al. |
| 2018/0178241 | A1 * | 6/2018 | Luo ......................... B29C 64/30 |
| 2018/0193954 | A1 * | 7/2018 | Yuan ....................... B22F 10/85 |
| 2018/0275636 | A1 | 9/2018 | Yan et al. |
| 2018/0281278 | A1 * | 10/2018 | George ............... H01S 5/18355 |
| 2018/0290386 | A1 * | 10/2018 | DeCiccio .................. A61L 2/22 |
| 2018/0304549 | A1 | 10/2018 | Safai et al. |
| 2018/0311757 | A1 | 11/2018 | Bucknell et al. |
| 2019/0004079 | A1 * | 1/2019 | Blom ...................... B33Y 50/02 |
| 2019/0018400 | A1 | 1/2019 | McCann et al. |
| 2019/0030823 | A1 | 1/2019 | McMurtry et al. |
| 2019/0079493 | A1 | 3/2019 | Yang et al. |
| 2019/0099953 | A1 | 4/2019 | MacNeish, III et al. |
| 2019/0118300 | A1 | 4/2019 | Penny et al. |
| 2019/0210106 | A1 * | 7/2019 | Gibson ................. B22F 3/1025 |
| 2019/0299536 | A1 * | 10/2019 | Putman .................. G06N 20/10 |
| 2019/0339671 | A1 * | 11/2019 | Yona ..................... B29C 64/393 |
| 2020/0103857 | A1 * | 4/2020 | Wynne ............... G05B 19/4099 |
| 2020/0139695 | A1 * | 5/2020 | Stallbaumer .......... B29C 64/393 |
| 2020/0233392 | A1 | 7/2020 | Jonas et al. |
| 2021/0141970 | A1 * | 5/2021 | Xu ........................... G06F 17/18 |
| 2021/0387415 | A1 * | 12/2021 | Crabtree ................ B33Y 50/00 |

FOREIGN PATENT DOCUMENTS

| | | |
|---|---|---|
| JP | 2017-13288 | 1/2017 |
| JP | 2017-030275 A | 2/2017 |
| KR | 1020160078093 A | 7/2016 |
| WO | 2017/085468 A1 | 5/2017 |
| WO | 2017/149308 A1 | 9/2017 |
| WO | 2017/163000 A1 | 9/2017 |

\* cited by examiner

SYSTEM AND METHOD OF MANUFACTURING AN ADDITIVELY MANUFACTURED OBJECT

CROSS-REFERENCE TO RELATED APPLICATION

This application is a divisional of U.S. patent application Ser. No. 16/298,550, filed Mar. 11, 2019, which claims the benefit of priority to U.S. provisional patent application Ser. No. 62/641,317, filed on Mar. 10, 2018.

FIELD OF THE INVENTION

The present invention relates to systems and methods of manufacturing an object using an additive manufacturing process.

BACKGROUND OF THE INVENTION

Additive manufacturing (sometimes referred to as 3D-printing) has provided industry with the ability to make objects having complex shapes that were not previously possible. Further, additive manufacturing has reduced manufacturing time and cost, thereby enabling new approaches to product development. However, the complexity of the objects made by additive manufacturing and the speed with which such objects can be made presents challenges with respect to producing finished objects that are within desired specifications. Additionally, as the use of additive manufacturing has grown from initially producing prototype parts to more recently producing functional, end-use parts, the requirements for such parts have become more demanding and, in some cases, additional processes beyond merely the printing step are needed to meet those requirements. These can include meeting certain tolerances across the geometrical dimensions of the parts, or certain degrees of surface smoothness, or other factors, as well as ensuring a certain level of consistency of meeting those requirements from one object to another, whether they are made on the same 3D printing machine or different machines. Presently, manufacturing problems are not discovered until many out-of-specification objects are produced. Additionally, as the number of machines making parts, and as the number of parts being made by those machines, grows, it is becoming more difficult and complex to manage the end-to-end process of fabricating the parts. Various approaches have been developed to focus on some of these issues during the printing stage, but less attention has been paid to the end-to-end additive manufacturing process for making a fully-ready part, as well as ways to more efficiently improve such end-to-end process to make better parts.

SUMMARY OF THE INVENTION

The invention may be embodied as a computer-implemented method of manufacturing an object via an additive manufacturing process. Such a method may include:
(a) providing a digital representation of a desired object and a manufacturing plan. The manufacturing plan may have instructions for both building and finishing an object that should produce the desired object (including all of its desired characteristics) via the additive manufacturing process;
(b) building and finishing the object via the additive manufacturing process according to the manufacturing plan to produce a manufactured object.

Such a method may include:
(a) comparing the manufactured object to the digital representation to determine whether the manufactured object has the desired characteristics. Such a comparison may be carried out after building the object but prior to finishing the object to determine whether the object has the desired characteristics. Such a comparison could also be carried out during printing, during finishing, or at some other point in the manufacturing process, and the manufacturing plan could be adjusted while that portion of the manufacturing process is occurring;
(b) identifying parameters of the manufactured object that are different from the desired characteristics;
(c) using the parameters to modify at least a portion of the manufacturing plan to produce a modified manufacturing plan.

The modified manufacturing plan may be used to complete manufacturing of the object using the modified manufacturing plan.

Another method that is in keeping with the invention may be a computer-implemented method of manufacturing an object via an additive manufacturing process. Such a method may include:
(a) providing a digital representation of a desired object and a manufacturing plan, wherein the manufacturing plan has instructions that should produce a desired object having desired characteristics via an additive manufacturing process;
(b) manufacturing an object via the additive manufacturing process according to the manufacturing plan to produce a manufactured object;
(c) comparing the manufactured object to the digital representation to determine whether the manufactured object has the desired characteristics;
(d) identifying parameters of the manufactured object that are different from the desired characteristics;
(e) using the parameters to modify the manufacturing plan to produce a modified manufacturing plan.

Each of the methods outlined above may be used to manufacture a second manufactured object via the additive manufacturing process according to the modified manufacturing plan.

Each of the methods outlined above may further include determining a probability that the manufacturing plan is likely to produce an object having the desired characteristics and comparing the determined probability to a pre-specified minimum probability. If the determined probability is less than the minimum probability, then the manufacturing plan may be modified until the probability equals or exceeds the minimum probability, and then the modified manufacturing plan may be used for building and finishing the object.

The additive manufacturing technology used in the additive manufacturing process may be fused deposition modeling, material jetting, stereo lithography, selective laser sintering, high-speed sintering, direct metal laser sintering, or layered object manufacturing. And, the manufactured object may have plastic, metal, or ceramic material.

Modifying the manufacturing plan may include modifying a portion of the manufacturing plan pertaining to:
(a) fabricating support material;
(b) removing unwanted support material and/or smoothing surfaces of build material;
(c) a speed at which layers or other portions of the object are formed;
(d) a temperature of material being used to form the object;

(e) an orientation of the object being manufactured; and/or (f) settings of one or more machines used to fabricate the object.

The methods may be carried out so as to perform an interim evaluation after manufacturing begins but before manufacturing is complete. Such an interim evaluation may identify aspects of a partially manufactured object that do not comply with an interim digital representation of the desired object. Those portions of the manufacturing plan pertaining to those aspects may be modified in order to address those aspects.

The invention may be embodied as a system for carrying out the methods outlined above. Such a system may be used to modify a manufacturing plan for an additively manufactured object. In one such system, there are:

(a) one or more databases storing a digital representation of a desired object having desired characteristics, and storing a manufacturing plan having desired steps which when carried out should produce a desired object via an additive manufacturing process;

(b) one or more communication links configured to transmit manufacturing information describing an additively manufactured object (the "AMO") and processes used to create the AMO;

(c) a coordinating computer connected to the communication links, the coordinating computer including a microprocessor programmed to:
  (i) receive the manufacturing information;
  (ii) compare the manufacturing information to the desired characteristics and the desired steps;
  (iii) identify parameters where the manufacturing information is different from the characteristics of the desired object or the manufacturing plan; and
  (iv) transmit a message describing the parameters.

The microprocessor is further programmed to modify the manufacturing plan corresponding to the parameters.

In some embodiments of the invention, at least a portion of the manufacturing information may be generated by a machine tasked with executing a portion of the manufacturing plan.

The system may be configured so that the communication links transmit instructions to a machine tasked with carrying out a portion of the manufacturing plan. As such, the instructions being followed by the machine may be modified. Such machines may include a machine that is tasked with fabricating build material and/or support material. Such a machine may include a machine that is tasked with removing unwanted support material and/or smoothing surface of build material.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
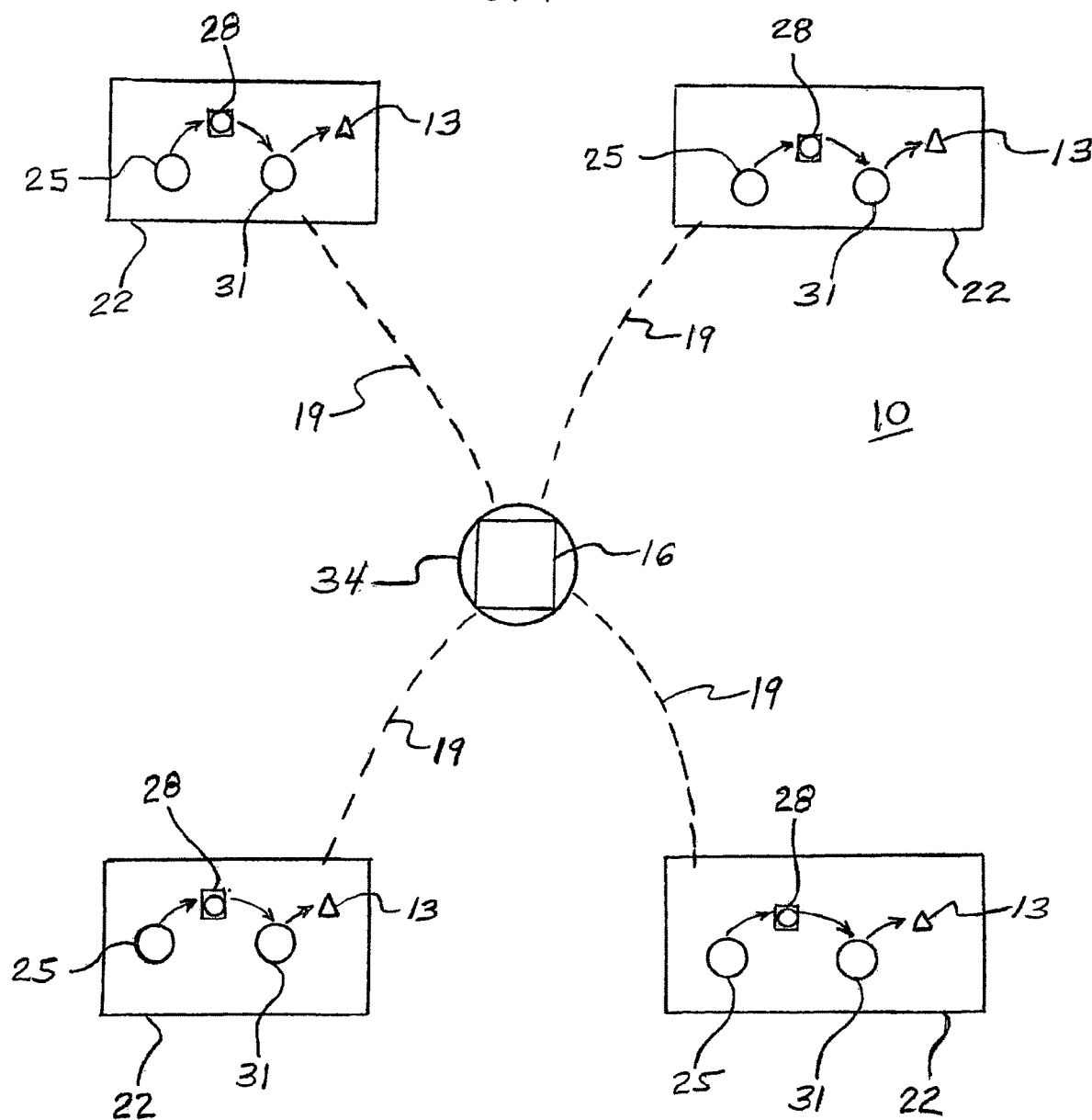
FIG. 1, which is a schematic of a system that is in keeping with the invention.

FIG. 1 depicts a system 10 that is in keeping with the invention. FIG. 1 schematically depicts a system 10 for facilitating the delivery, execution and modification of a manufacturing plan describing how an object 13 is to be manufactured using an additive manufacturing process. Such a plan may include aspects focused on building an object, for example via a 3D printing process, as well as finishing that built object, for example by contacting the built object with a chemical solution that dissolves unwanted support material and/or abrasive material that erodes unwanted support material or smooths surfaces of the build material. For clarity, steps taken to build an object may include depositing material in layers that ultimately are part of the completed object as well as depositing material (e.g. unwanted support material) that is later removed during a finishing operation and is not part of the completed object.

In FIG. 1 there is a database 16 for storing one or more manufacturing plans and four communication links 19, which can be bidirectional communication links. Each communication link 19 may permit manufacturing information pertaining to a particular object being manufactured to be transmitted from a manufacturing location 22 to the database 16, and may permit a manufacturing plan to be transmitted from the coordinating computer 34 to a particular manufacturing location 22.

Each manufacturing location 22 is shown having a machine 25 for carrying out an additive manufacturing part-making process. Such a machine 25 produces an interim object 28, which may then be subjected to a finishing process using a finishing machine 31. Transferring the interim object 28 from the build machine 25 to the finishing machine 31 could be done manually or robotically. Once finished, the manufactured object 13 may be removed from the finishing machine 31 and evaluated to determine whether the manufactured object 13 has desired characteristics. Such evaluation may be performed manually, by automation, or a combination of both. Information generated by such an evaluation may be transmitted via the communication link 19 to the database 16, where the information may be compared by a coordinating computer 34 to identify parameters that are not in keeping with the desired characteristics. Those parameters may be used to identify ways to modify the manufacturing plan so that future objects have the desired characteristics, or are at least closer to the desired characteristics. Such modifications may be identified manually, by automation, or a combination of both. While the embodiment of FIG. 1 shows machines 25 and 31 to be separate machines, they may combined into a single machine providing both build and finishing functionality. Also, while the embodiment of FIG. 1 shows a location 22 to include both the machines 25 and machines 31 to be in a single location, machines 25 and 31 could be in different locations from each other. Additionally, each location 22 may include multiple machines 25 and machines 31 that are used collectively for parallel manufacturing of objects 28.

The database 16 may be used to store a digital representation of the desired manufactured object that has the desired characteristics, such as the geometry, dimensions, tolerances and surface roughness of the desired manufactured object. The database 16 may be used to store a manufacturing plan that has desired steps, which when carried out should produce the desired object via an additive manufacturing process.

The manufacturing information may include information about a particular additively manufactured object (an "AMO") and/or the manufacturing process that will be or was carried out to create the AMO. For example, manufacturing information may include the operating settings (e.g. time, temperature, speed) of the machine 25 tasked with building the AMO (such as a 3D printer), a description about the origin and type of the raw materials used to build the AMO, an identification number of the person that monitored and/or controlled the machine 25 that built the interim object 28 (that ultimately became the AMO), as well as the ambient temperature and humidity of the room where the machine 25 resides. Further, the manufacturing information may include any other variables, identifiers, settings, instructions or environmental or other conditions relevant for a particular machine 25.

Manufacturing information may include information about the settings (e.g. temperature, speed, duration, type of detergent or other fluids/chemicals to be used, type of abrasive media to be used) of the machine 31 or plurality of machines 31 that will be or were used to perform finishing steps, such as steps to remove unwanted support material (the "RUSM Steps") from the unfinished AMO, steps to smooth surfaces (reduce surface roughness) of the unfinished AMO (the "Smoothing Steps"), an identification number of the individual that monitored and/or controlled the RUSM Steps and Smoothing Steps, as well as the ambient temperature and humidity and other relevant conditions where the machines 31 for carrying out the RUSM and Smoothing Steps resides. Manufacturing information may include the dimensions, tolerances, surface finish (e.g., smoothness or roughness), and other information corresponding to the AMO itself. The manufacturing information may include any other variables, identifiers, settings, instructions or other environmental or other conditions relevant for a particular machine 31. The manufacturing information may be transmitted via the communication links 19 to the coordinating computer 34.

The coordinating computer 34 may be programmed to (a) receive the manufacturing information pertaining to an AMO, (b) compare that manufacturing information to the desired characteristics of the desired object, and/or the manufacturing plan, (c) identify parameters that the manufacturing information indicates are not in keeping with the characteristics of the desired object or the manufacturing plan, and/or whether manufacture of the AMO should continue or be aborted. After such parameters are identified, a message describing the parameters may be transmitted, for example to a person responsible for the design and/or manufacturing of the desired object, and that person may then consider how to modify the manufacturing plan. Or, the message may be formulated automatically by the coordinating computer to automatically provide one or more of the machines 25, 31 with a modified plan for completing manufacture of the object. For example, when a particular parameter is identified in an interim object 28, the coordinating computer may recognize that particular parameter and respond by selecting a corresponding modification of the manufacturing plan. For instance, if the interim object 28 produced by the build-machine 25 has a surface roughness that is rougher than normal, upon identifying the excess roughness as a parameter, the coordinating computer 34 may increase the time during which the object is subjected to the finishing process of machine 31 and/or may increase the temperature of a chemical solution used in the machine 31 to smooth the object.

It should be noted that the object may be evaluated while the object is being built by the build machine 25, and the resulting manufacturing information may be used by the coordinating computer 34 to alter the manufacturing plan being executed by the build machine 25, prepare the finishing machine 31 for the particular interim object 28 expected to be produced by the build machine 25, or alert a human to an issue that requires human input. An issue requiring human input may result in the human deciding that the object can not be efficiently brought to be in keeping with the desired characteristics, and that manufacturing of that particular object should cease, thereby saving time and money associated with completing the manufacture of that particular object.

With such parameters in hand, the manufacturing plan, the machines 25, 31 used to manufacture, the materials used in the machines 25, 31, and/or the ambient conditions can be modified so that a next attempt to produce the desired object is more likely to produce an AMO that more closely matches the desired object and/or so that the manufacturing plan for an AMO that is about to be manufactured or is currently being manufactured is modified before manufacturing of that AMO is started or completed, respectively. As such, the coordinating computer 34 provides a logistics aspect that facilitates efficient execution of the manufacturing plan (for example, the expected time that an object is likely to be ready to transfer from the build machine 25 to the finishing machine 31), and modification of that plan even while an object is being manufactured. The coordinating computer 34 may be further programmed to modify those portions of the manufacturing plan that correspond to the parameters. Once the manufacturing plan is modified, instructions may be transmitted via the communication link 19 to the appropriate machine 25, 31 or to an individual in order to carry out the modified plan.

Additive manufacturing technologies to which the invention may be applied include, among others, fused deposition modeling, material jetting, stereo lithography, selective laser sintering, high-speed sintering, direct metal laser sintering, and layered object manufacturing. For clarity, the manufactured object 13 may be plastic, metal, ceramic and/or any other material or combinations of materials (e.g., composites) used in additive manufacturing.

RUSM and Smoothing Steps to which the invention may be applied include, among others, those that use liquids, which may be applied to the AMO in a bath, vat, chamber or from high pressure spray nozzles. Also, the invention may be used with RUSM and Smoothing Steps that rely on abrasive solids or combinations of liquids and abrasive solids to remove unwanted support material and/or smooth surfaces of build material.

It will now be recognized that at least some of the manufacturing information may be generated by a machine 25, 31 that is tasked with executing a portion of the manufacturing plan, or may be generated by sensors located on or near such machines. Some manufacturing information may be provided by the makers of the machines 25, 31 as part of the machines' specifications, operating instructions or otherwise, and may be available within stored memory of such machines, and in either case may be communicated via links 19. Some manufacturing information, for example an employee identification number, may be provided to the communication links 19 via machines 25, 31 for building or cleaning an AMO, or may be provided via a computer located nearby.

It should be noted that a system that is in keeping with the invention may distribute at least some of the coordinating computer's 34 functionality to locally situated computers and databases (or other storage memory). For example, such a computer may be situated locally at one or more of the locations 22 to facilitate gathering of manufacturing information, and making changes to a manufacturing plan being executed at that location 22. Such locally situated computers may be stand-alone computers or may be integrated into one or more, or all, of the machines 25, 31. In this manner, for example, a manufacturing plan for a particular finishing machine 31 may be modified based on manufacturing information corresponding to an object being produced by a manufacturing machine 25 at that same location 22. The modified plan may be stored on the local computer, in the local database or other storage memory, and transmitted to other local machines 25, 31. In this manner, such a locally situated computer facilitates a manufacturing process being carried out within local machine 25, between one local machine 25 and another local machine 31, between one local machine 25 and another local machine 25, or between one local machine 31 and another local machine 31. And, such a locally situated computer may communicate with a centrally located coordinating computer, or other locally situated computers in order to communicate modified plans that may benefit other locations 22.

A modified manufacturing plan may be created in response to manufacturing information received from a location 22 (including one or more machines 25, 31 at a location 22), or such a modified plan may arise from some other reason not related to manufacturing information. That is to say, a modified plan need not arise in order to correct a problem identified from manufacturing information. Further, a modified plan may be transmitted and implemented while a manufacturing process is being carried out. As such, a particular plan for a particular manufacturing operation may be modified while that manufacturing operation is being carried out. Consequently, for example, if a printing operation or finishing operation has begun, the plan for such a printing operation or finishing operation may be modified while such a printing operation or finishing operation is in process. As one example, during a printing operation it may be determined that the surface roughness of the object being fabricated is already rougher than had been anticipated based on the manufacturing plan. The manufacturing plan may be modified to specify a finer build material layer thickness to achieve a less rough surface, and that modified plan could be executed for the remainder of the object being printed.

Figure 2:
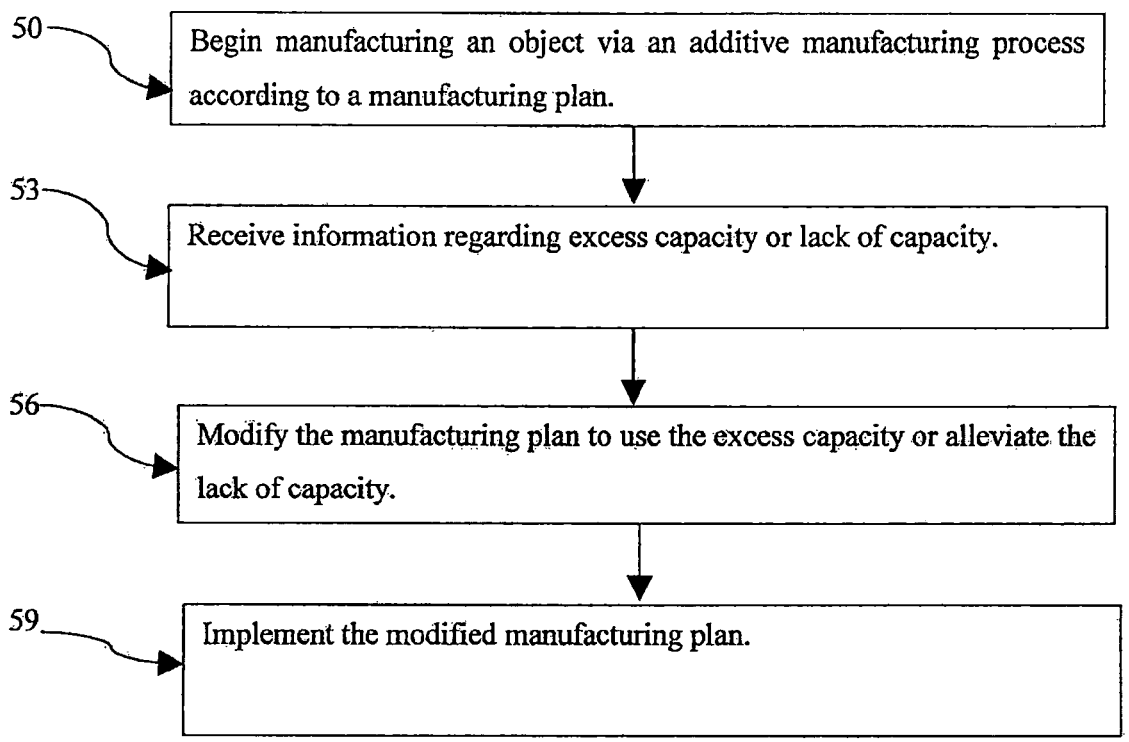
FIG. 2, which is a flow diagram depicting a method that is in keeping with the invention.
Figure 3A:
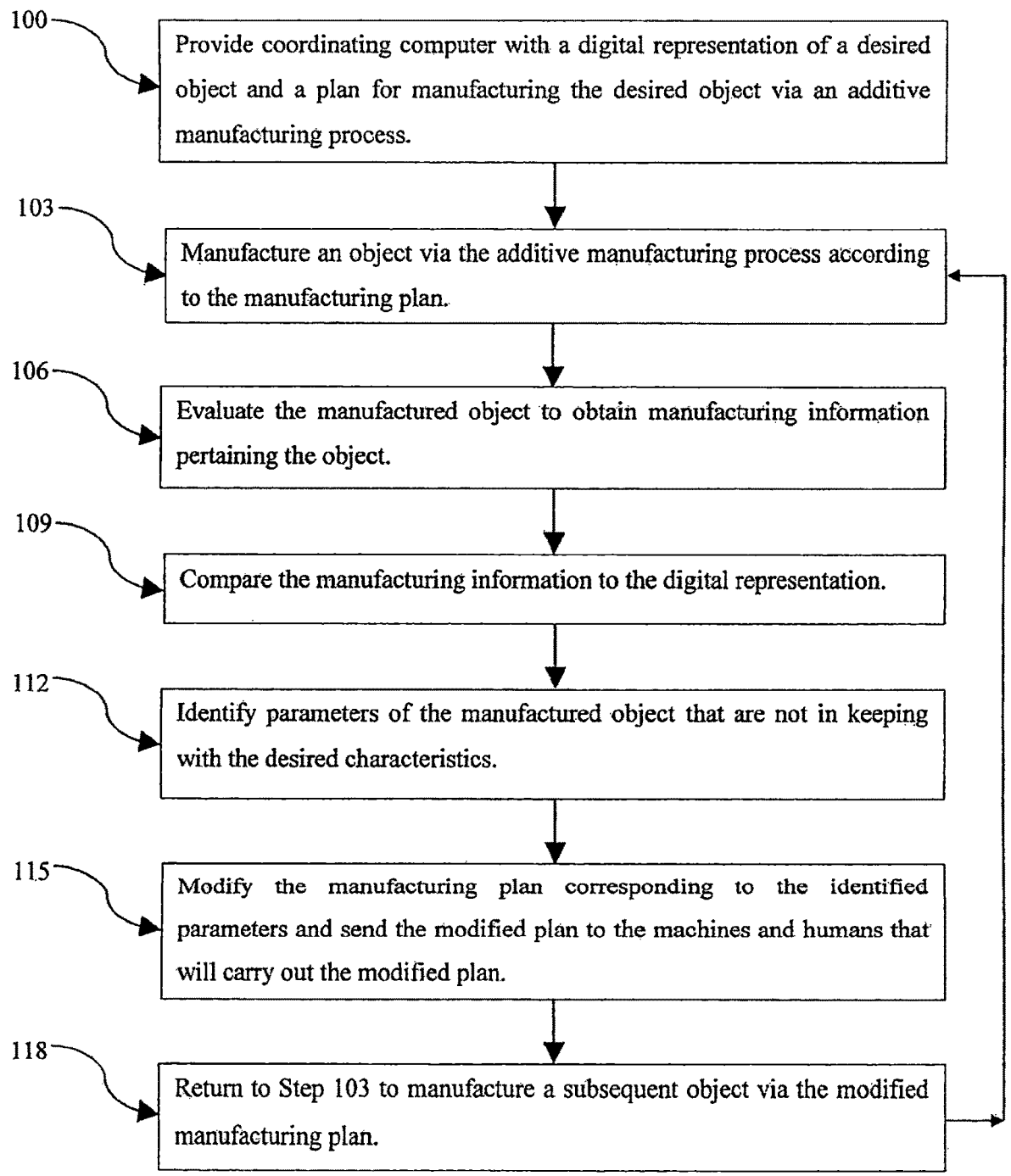
FIG. 3A, which is flow diagram depicting a method that is in keeping with the invention.

Such an ability to modify manufacturing operations "on the fly" may also be used to accommodate excess capacity or a lack of capacity in other areas, and thus create a more efficient manufacturing operation. FIG. 2 depicts a method that modifies a manufacturing plan in order to utilize excess capacity or alleviate a lack of capacity. For example, if a delivery truck is ready to be loaded, but there are not enough finished products to fill the truck, a message may be sent and received 53 by the coordinating computer 34, the manufacturing plan may be modified 56, and the modified manufacturing plan may be sent to and implemented 59 at one or more of the locations 22 to speed up the manufacturing process, such as by increasing the speed at which objects are printed by machines 25 and/or finished by machines 31. Or, if a particular finishing machine 31 has too many objects waiting to be finished, a message may be sent and received 53 by the coordinating computer 34, the manufacturing plan may be modified 56, and the modified manufacturing plan may be sent to and implemented 59 at one or more of the locations 22 to slow down one or more printing machines 25, at least until that finishing machine 31 has alleviated the backlog. Similarly, if a finishing machine 31 has become available sooner than expected, a manufacturing machine 35 can be instructed to speed up a current fabrication of an object 28 (e.g., by increasing the speed of the printhead or increasing build material layer thickness) to take advantage of the available finishing machine 31. The invention may be embodied as a method of manufacturing an object via additive manufacturing. FIG. 3A depicts one such method that is a computer-implemented method of manufacturing an object having desired characteristics via an additive manufacturing process. A digital representation of a desired object and a manufacturing plan are provided 100 to a coordinating computer. When the manufacturing plan is carried out, the desired object should be produced meeting the requirements and specifications for the part, but this is not always the case. Hence there needs to be a method for determining which desired characteristics are not being achieved, and for gathering and then communicating information in a way that can be used to modify the manufacturing plan.

In one such method, an AMO is manufactured 103 via the additive manufacturing process according to the manufacturing plan, and then that AMO is evaluated 106 to obtain information that is compared 109 to the digital representation in order to determine whether the AMO has the desired characteristics. To the extent that the AMO does not have the desired characteristics, those parameters of the AMO that are not in keeping with the desired characteristics are identified 112, and used to modify 115 the manufacturing plan. Using the modified manufacturing plan, a next AMO can be manufactured 118 to have the desired characteristics, or to be closer to those desired characteristics than the prior AMO.

Modifying 115 the manufacturing plan may include modifying a portion of the manufacturing plan pertaining to one or more of the following: the type of build material, the type of support material, the parameters for depositing or forming the build material, the parameters for depositing or forming the support material, a speed at which layers or other portions of the object are formed, a temperature of material being used to form the object, an orientation of the object being manufactured, settings of one or more machines used to fabricate the object, the method of removal of unwanted support material and the method of smoothing surfaces, and the settings and parameters for such removal and smoothing (such as liquid and abrasive materials, temperature, time, pressure, level of agitation).

Figure 3B:
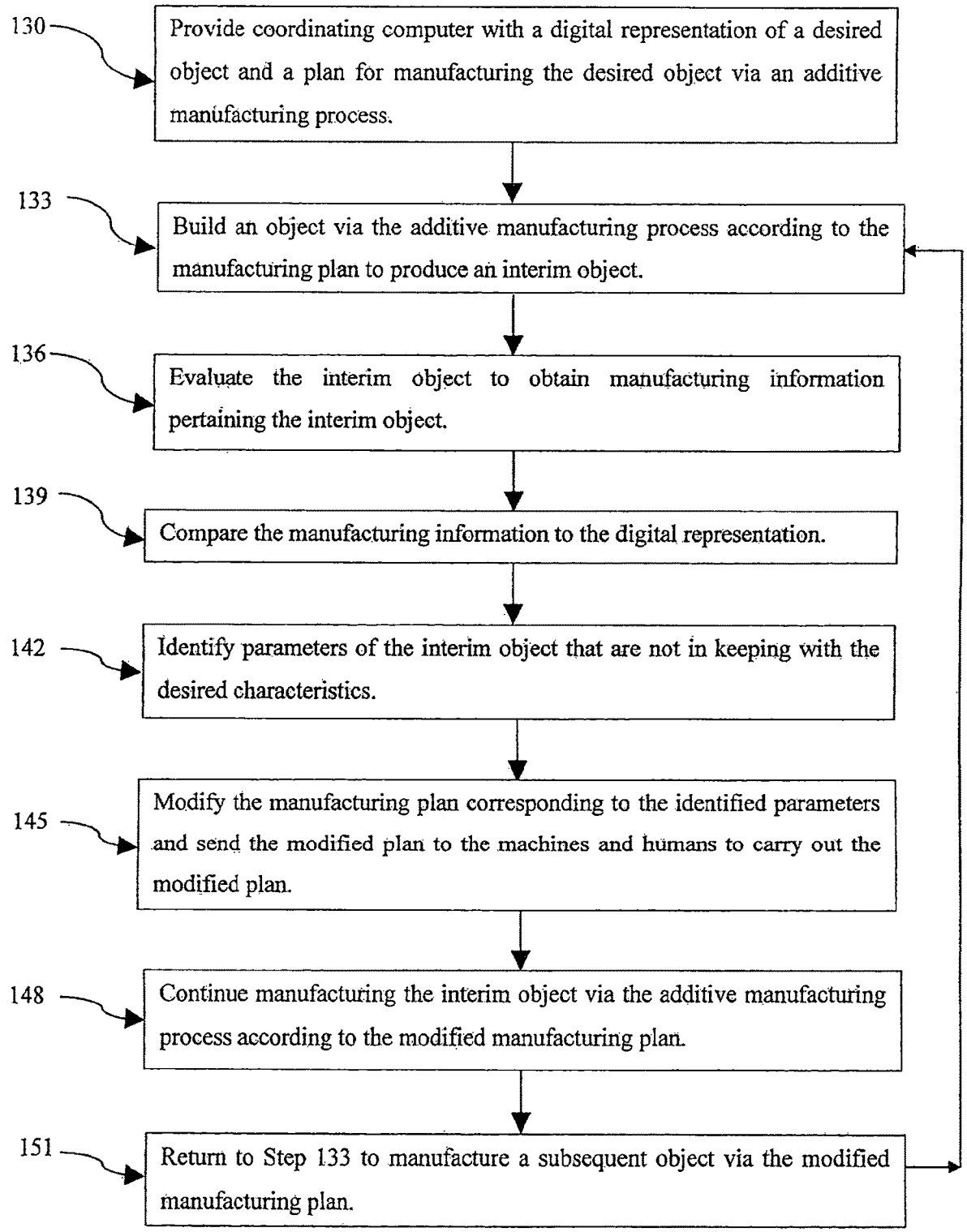
FIG. 3B, which is a flow diagram depicting a method that is in keeping with the invention.

FIG. 3B illustrates steps of a method in which an interim object is evaluated 136, and the manufacturing plan is modified 145 based on information obtained from that interim evaluation. In this method, the manufacturing plan may be modified 145 and the modifications may be applied (a) to one or more of the remaining manufacturing steps in order to complete manufacturing 148 of the interim object, as well as (b) to the manufacture 151 a subsequent object. In this manner, modifications of the manufacturing plan arising from a particular object can be swiftly applied to the manufacturing plan of a subsequent object, and this may be done for subsequent objects for which manufacturing has already begun.

Figure 3C:
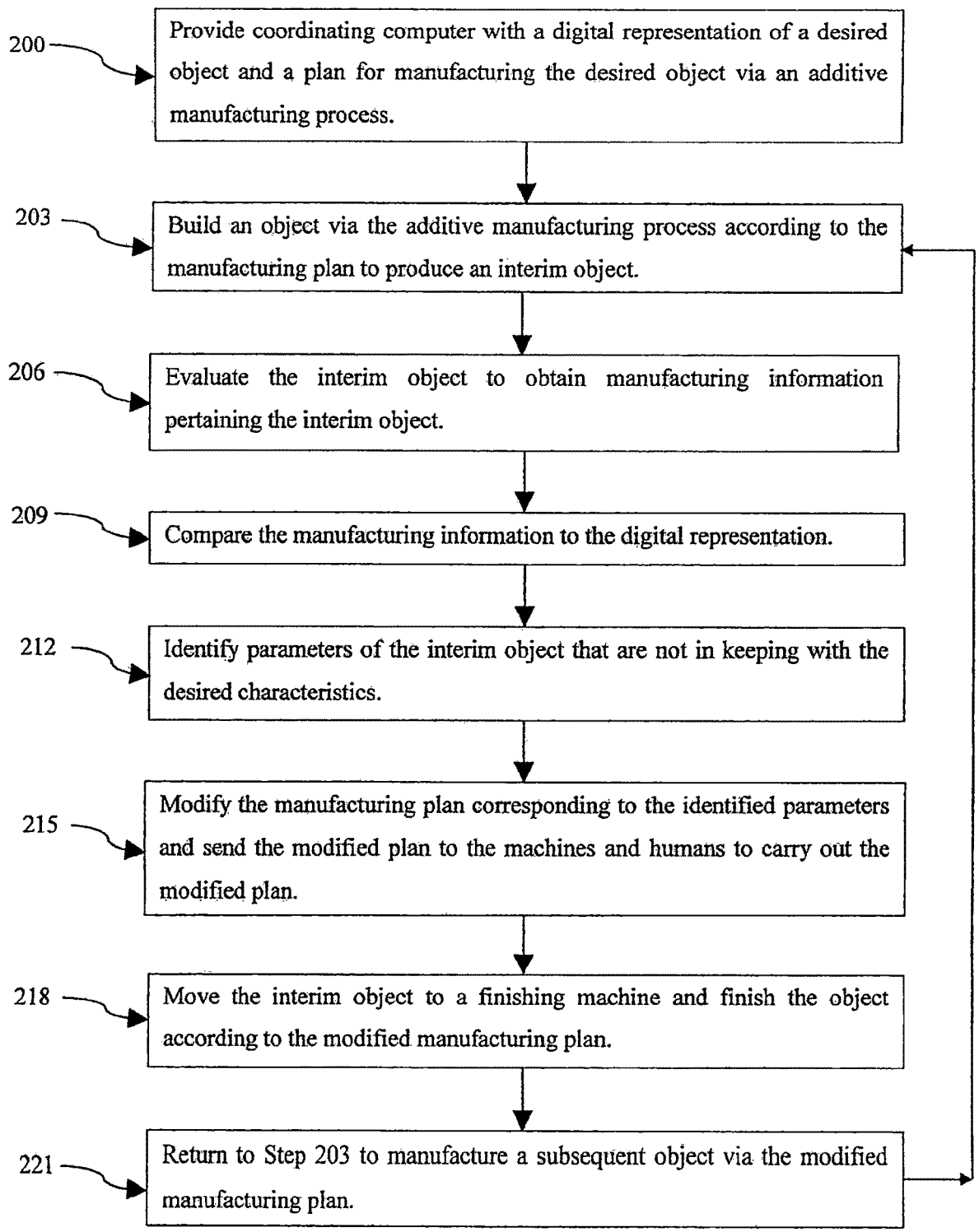
FIG. 3C, which is a flow diagram depicting a method that is in keeping with the invention.

FIG. 3C is a variation of the method depicted in FIG. 3B in which an interim object is evaluated 206 after building 203 (i.e. printing operations) occurs but before finishing, 218. The information generated by that evaluation 206 may be used to modify 215 the manufacturing plan corresponding to finishing operations for that particular interim object as well as the manufacturing plan for a subsequent object. Then, that evaluated interim object is moved to a finishing machine and finished 218 according to the modified manufacturing plan, and the subsequent object is built 221 according to the modified manufacturing plan. That subsequent object may already be in the building operations 203 when the interim object is evaluated 206.

Figure 4:
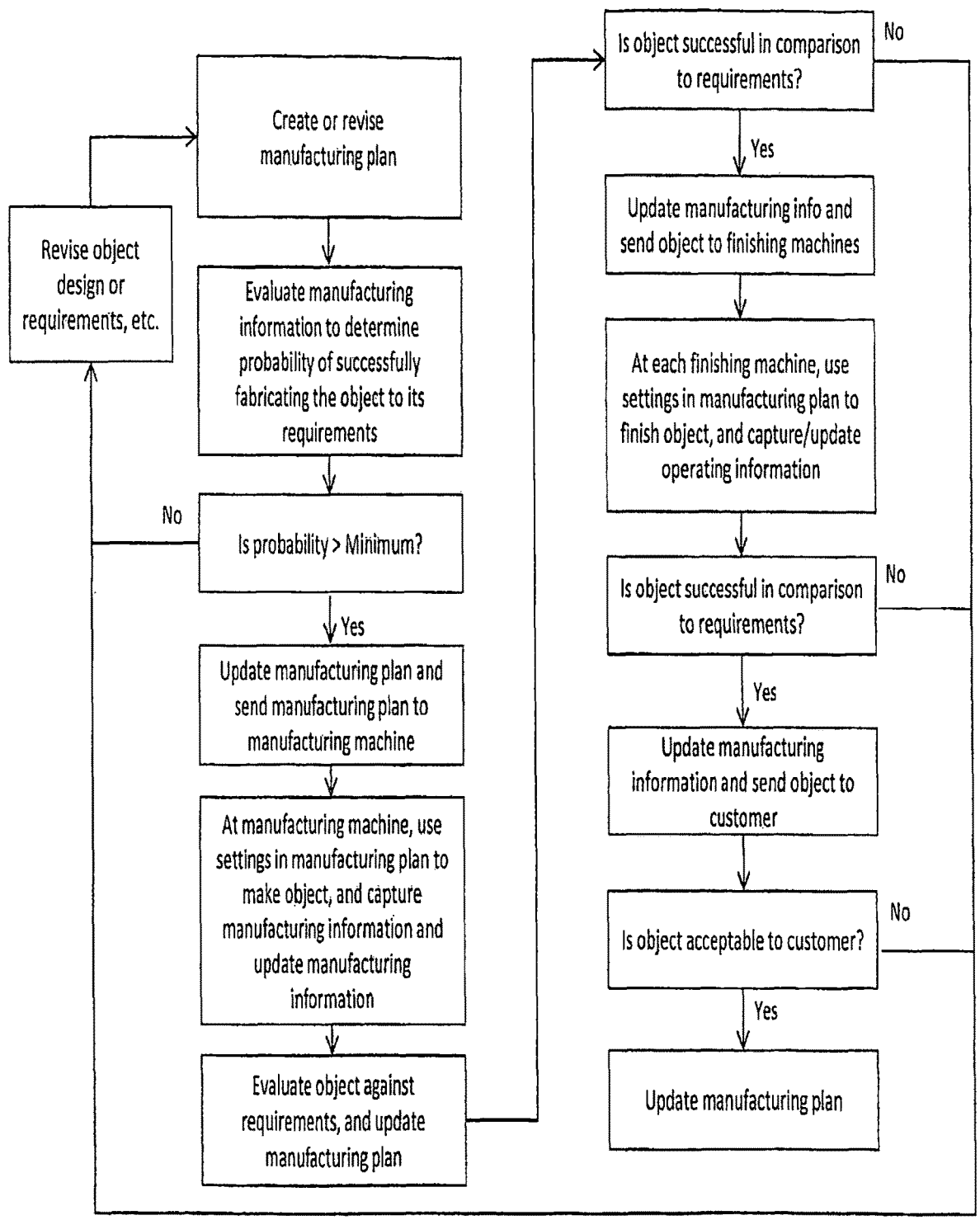
FIG. 4, which is a flow diagram depicting a method that is in keeping with the invention for modifying a manufacturing plan.

FIG. 4 is a method that combines and augments the features depicted in FIGS. 3A and 3B. In the method of FIG. 4, the manufacturing plan may be evaluated prior to commencing actual manufacturing of an object to evaluate whether following the manufacturing plan is likely to produce an object having the desired characteristics. This evaluation can be performed manually by an operator or by automation such as using computer programming carrying out evaluation algorithms and the like. If it is determined that the probability of fabricating the object is less than a specified minimum probability, then the manufacturing may be modified to better ensure a requisite probability of success. Such modifications may include, among other things, modifications to the geometry, dimensions or desired tolerances or surface smoothness of the parts, as well as changes to the machines, materials, settings and other parameters for building and finishing the object. The specified minimum probability may be the same for all objects or different for different objects, and may vary based on the importance of how closely the object needs to meet the desired characteristics. The method further includes a final step of having the customer, end-user or other receiver of the object evaluate the object for acceptability. If such person determines that the object is not acceptable, then the reasons can be captured and the manufacturing plan can be updated so that the next unit of the object will be more likely to meet the person's expectations or requirements.

Manufacturing 103, 133 the AMO may be accomplished via additive manufacturing printing technologies such as fused deposition modeling, material jetting, stereo lithography, selective laser sintering, high-speed sintering, direct metal laser sintering, or layered object manufacturing. Such manufacturing 103 may be used to form objects made of plastic, metal, ceramic and/or any other material or combinations of materials (e.g., composites) used in additive manufacturing.

Manufacturing 103, 133 of the AMO may be further accomplished via additive manufacturing finishing technologies (for RUSM and Smoothing Steps) such as those that use liquids, abrasive solids or combinations thereof which may be applied to the AMO in a bath, vat, chamber or from high pressure spray nozzles.

The method need not be limited to evaluating 106 the AMO at the end of the manufacturing process. For example, as shown in FIG. 3B at Step 135, an interim object 28 that is not fully manufactured may be evaluated before the final manufacturing step is completed. By making such an interim evaluation 133, it may be possible to obtain information corresponding to the partially manufactured interim object 28, compare 139 that information to corresponding information associated with an interim digital representation of the object corresponding to that stage of the manufacturing process, and then identify 142 parameters of the partially manufactured interim object 28 that are not in keeping with that interim digital representation. By doing so, it may be possible to identify differences and then modify the manufacturing process 145 for the next step 148 in the additive manufacturing process for the AMO at hand, and also so that a subsequent manufactured object meets or is closer to the interim characteristics. For example, after the printing step, it may be determinate that a surface of the AMO is rougher than would have been expected based on the manufacturing plan. The portion of the manufacturing plan for the Smoothing Step could then be modified to address this additional roughness and thus ensure a better outcome for this particular AMO. Such modifications may include, among others, increasing one or more of the time, temperature, concentration of abrasives and level of agitation used in the machine 31.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A computer-implemented method of manufacturing an object via additive manufacturing, comprising:
   providing a digital representation of a desired object and a manufacturing plan, the manufacturing plan having instructions for both building and finishing an object that should produce the desired object via an additive manufacturing process, wherein the desired object has desired characteristics;
   building and finishing the object via the additive manufacturing process according to the manufacturing plan to produce a manufactured object;
   while finishing the object, capturing operating information at a finishing machine that uses settings in the manufacturing plan to finish the object;
   modifying the instructions in the manufacturing plan for building the object to produce a modified manufacturing plan using the operating information captured at the finishing machine.

2. The method of claim 1 further comprising:
   comparing the manufactured object to the digital representation to determine whether the manufactured object has the desired characteristics;
   identifying parameters of the manufactured object that are different from the desired characteristics; and
   using the parameters to modify at least a portion of the manufacturing plan to produce the modified manufacturing plan.

3. The method of claim 1 further comprising:
   comparing the manufactured object to the digital representation after building the object but prior to finishing the object to determine whether the object has the desired characteristics;
   identifying parameters of the manufactured object that are different from the desired characteristics; and
   using the parameters to modify at least a portion of the manufacturing plan relating to finishing the object to produce the modified manufacturing plan.

4. The method of claim 1, wherein the additive manufacturing process comprises one or more of fused deposition modeling, material jetting, stereo lithography, selective laser sintering, high-speed sintering, direct metal laser sintering, or layered object manufacturing.

5. The method of claim 1, wherein modifying the manufacturing plan includes modifying a portion of the manufacturing plan pertaining to fabricating support material.

6. The method of claim 1, wherein modifying the manufacturing plan includes modifying a portion of the manufacturing plan pertaining to one or both of removal of unwanted support material and smoothing of surfaces of build material.

7. The method of claim 1, wherein modifying the manufacturing plan includes modifying a portion of the manufacturing plan pertaining to a speed at which layers or other portions of the object are formed.

8. The method of claim 1, wherein modifying the manufacturing plan includes modifying a portion of the manufacturing plan pertaining to a temperature of material being used to form the object.

9. The method of claim 1, wherein modifying the manufacturing plan includes modifying a portion of the manufacturing plan pertaining to an orientation of the object being manufactured.

10. The method of claim 1, wherein modifying the manufacturing plan includes modifying a portion of the manufacturing plan pertaining to settings of one or more machines used to fabricate the object.

11. The method of claim 1, further comprising performing an interim evaluation after manufacturing begins but before manufacturing is complete, to identify aspects of a partially manufactured object that do not comply with an interim digital representation of the desired object, and modifying portions of the manufacturing plan pertaining to the aspects.

12. A system for modifying a manufacturing plan for an additively manufactured object, wherein the manufacturing plan has desired steps which when carried out should produce the desired object via an additive manufacturing process, comprising:
a build machine for carrying out an additive manufacturing part-making process to produce an interim object;
a finishing machine operative to perform a finishing operation on the interim object; and
a coordinating computer including a microprocessor programmed to: (a) receive manufacturing information from the build machine and the finishing machine; (b) compare the manufacturing information to desired characteristics of the additively manufactured object and the desired steps to identify differences between the manufacturing information and the desired characteristics of the additively manufactured object or the manufacturing plan; and (c) use the manufacturing information captured at the finishing machine to modify the instructions in the manufacturing plan for building the object to produce a modified manufacturing plan.

13. The system of claim 12, wherein the build machine is tasked with fabricating build material and support material.

14. The system of claim 12, wherein the finishing machine is tasked with one or both of removing unwanted support material and smoothing of surfaces of build material.

15. A computer-implemented method of manufacturing completed objects using additive manufacturing, comprising:
using building instructions to operate an additive manufacturing machine to build an interim object;
finishing the interim object in a finishing operation to produce one completed object;
capturing information while finishing the interim object;
developing modified building instructions based on the information captured during the finishing operation; and
forming a manufacturing plan that combines the modified building instructions with finishing instructions.

16. The method of claim 15 further comprising:
using the manufacturing plan to manufacture another completed object.

17. The method of claim 15 wherein the manufacturing plan is used in the same additive manufacturing machine that was used to build the interim object.

18. The method of claim 15 wherein the modified building instructions include a change in orientation of an interim object to be built.

19. The method of claim 15 wherein the manufacturing plan is used in an additive manufacturing machine other than the additive manufacturing machine that was used to build the interim object.

20. The method of claim 15 wherein the finishing instructions in the manufacturing plan provide for a finishing operation that differs from the finishing operation used to produce the one completed object.

* * * * *